United States Patent
Lancelle (10) Patent No.: US 6,789,952 B2
(45) Date of Patent: Sep. 14, 2004

(54) CONNECTION DEVICE FOR OPTICAL FIBRES

(75) Inventor: Jean-Marc Lancelle, Glisolles (FR)

(73) Assignee: Connecteurs Electriques Deutsch, Evreux (FR)

( * ) Notice: Subject to any disclaimer, the term of this patent is extended or adjusted under 35 U.S.C. 154(b) by 0 days.

(21) Appl. No.: 10/220,321

(22) PCT Filed: Feb. 23, 2001

(86) PCT No.: PCT/FR01/00525

§ 371 (c)(1),
(2), (4) Date: Dec. 9, 2002

(87) PCT Pub. No.: WO01/65284

PCT Pub. Date: Sep. 7, 2001

(65) Prior Publication Data

US 2003/0147596 A1 Aug. 7, 2003

(30) Foreign Application Priority Data

Mar. 3, 2000 (FR) .............................. 00 02739

(51) Int. Cl.[7] .............................................. G02B 6/38
(52) U.S. Cl. ........................................................ 385/73
(58) Field of Search ............................. 385/73, 75, 76, 385/78, 55, 58

(56) References Cited

U.S. PATENT DOCUMENTS

| 4,682,848 A | 7/1987 | Cairns et al. ................. 385/69 |
| 4,696,540 A | 9/1987 | Adams et al. ................ 385/66 |
| 4,756,595 A | 7/1988 | Braun et al. .................. 385/75 |
| 4,887,883 A | 12/1989 | Darbut et al. ................. 385/58 |
| 5,146,524 A | 9/1992 | Berg ........................... 385/75 |

FOREIGN PATENT DOCUMENTS

EP     0 298 144     1/1989

Primary Examiner—Tuslidas C. Patel
(74) Attorney, Agent, or Firm—Young & Thompson (57) ABSTRACT

A connection device (1) for optical fibers, for use in a polluted environment includes a first connector (2) designed to be associated with at least a first optical fiber (16) and a second connector (3) designed to be associated with at least a second optical fiber (25) to be connected to the first fiber, wherein one of the connectors (2, 3) carries a fluid reserve (36) having a refractive index equal to that of the optical fibers, and at least pumping means (37) connected to said fluid reserve and which, in operation, can be actuated in response to connecting and disconnecting movements of the two connectors (2, 3) to inject, at each connecting/disconnecting movement, the fluid into a space (58) encompassing the front ends of the two fibers bringing them closer together or spacing them apart.

13 Claims, 9 Drawing Sheets

CONNECTION DEVICE FOR OPTICAL FIBRES

BACKGROUND OF THE INVENTION

The present invention concerns a connection device for optical fibres, comprising a first connector intended to be associated with at least a first optical fibre and a second connector intended to be associated with at least a second optical fibre which is to be connected to the first fibre.

There already exist many devices for connecting optical fibres together or effecting hybrid connections between two cables each containing at least one optical fibre and at least one electrical conductor. The optical fibres used to convey signals or information usually consist of a sheath surrounding a core made from refringent material, whose diameter has a value of between a few microns and a few tens of microns depending on whether it is a case of a monomode or multimode fibre. Under these circumstances, when the connection is to be made in a polluted fluid (liquid or gaseous) environment, for example containing particles of sand or dust or other fine inert or living particles, it is particularly important that, when two optical fibres are connected to each other, the front faces of the fibres to be joined are not soiled by one or more particles and/or that one or more particles do not remain captive between the front faces of the said fibres joined end to end. This is because, if this occurred, the transmission of the signals or information by the said fibres could be seriously affected thereby.

When it is a case of joining two optical fibres in air, it has already been proposed to place a drop of a fluid, in general in the form of a gel, having a refractive index equal to or very close to that of the optical fibres, on the end of each of the two optical fibres to be joined and then to place the two optical fibres end to end. Thus optical continuity, that is to say continuity of the refractive index, is ensured in the joining area of two fibres, even if there remains a small interstice between the two fibres after they are joined.

However, such a method is difficult to implement when the two optical fibres must be joined in a polluted fluid environment. This is because it is not always possible, in the polluted fluid environment, to manually put drops of gel on the ends of the fibres to be joined. Nor is it always possible to place drops of gel on the ends of the fibres to be joined whilst they are outside the polluted fluid environment, either because one of the two fibres is continuously in the polluted fluid environment and cannot be extracted therefrom, or because, even if a drop of gel is put at the end of a fibre whilst it is situated outside the polluted fluid environment, it is not certain that, after having been immersed in the polluted fluid environment, there will remain a sufficient quantity of gel at the end of the fibre at the time it is joined with another fibre. Such a situation may for example occur when it is a case of connecting optical fibres in an undersea environment, for example in order to connect a cable containing optical fibres to an undersea well head.

SUMMARY OF THE INVENTION

The purpose of the present invention is therefore to provide a connection device for connecting optical fibres in a polluted environment.

To this end, the connection device according to the invention is characterised in that one of the two connectors carries a reserve of a fluid having a refractive index equal to that of the optical fibres, and at least one pumping means which is connected to the said fluid reserve and which, in service, can be actuated in response to the connection and disconnection movements of the two connectors in order, at each connection/disconnection movement, to inject fluid into a space surrounding the front ends of the two fibres bringing them closer together or spacing them apart.

Thus, with the connection device according to the invention, when the two connectors are connected to each other in a polluted fluid environment, fluid (gel) having a refractive index equal to that of the optical fibres is injected into the space surrounding the front ends of the two fibres to be joined. The effect of this injection is to drive away any polluted fluid which might be between the front ends of the two fibres to be joined, and to clean the said front ends. After joining the two fibres, the gel thus injected provides optical continuity between the two fibres, even if there remains a small interstice between them after they are joined. In addition, when the two connectors are subsequently separated from each other, gel is once again injected into the space surrounding the front ends of the two fibres whilst they are separated from each other, so that, after their separation, the front ends of the two fibres remain protected by a certain quantity of gel, thus preserving the fibres against an attack by the polluted fluid environment, in particular by sea salt where the invention is applied to connectors intended to be used in sea water.

The connection device according to the invention can also have one or more of the following characteristics:

the first connector comprises a first fixed casing or base which has, in its end face turned towards the second connector, a first cavity which is open towards the said second connector and on the bottom of which there project on the one hand at least one fixed optical contact in the form of a socket, in which the first optical fibre is fixed, and on the other hand at least one pusher forced by a first spring towards the second connector;

the first optical fibre is provided with a first rigid contact piece which extends axially beyond the end of the fixed optical contact projecting in the said first cavity, and the fixed optical contact carries a protective cowl which, in the disconnected state of the connection device, covers the said first contact piece and is at least partially filled with the said fluid;

the protective cowl can slide on the fixed optical contact and has, in the region where it covers the free end of the first contact piece, at least two contiguous lips made from elastomer material, which can separate in order to allow the said first contact piece to pass when the protective cowl is subjected to a thrust directed in the direction of the connection movement of the second connector towards the first connector, counter to the force of a second spring forcing the said protective cowl towards the second connector;

the second connector comprises a second moving casing or plug, which can be fitted in the first cavity of the first casing and which has, in its end face turned towards the first connector, a second cavity which is open towards the said first connector and which contains at least one movable optical contact in the form of a socket, in which the second optical fibre is fixed, which is provided with a second rigid contact piece, the said movable optical contact being aligned axially with the fixed optical contact of the first casing when the second casing is fitted in the first cavity of the first casing, and being mounted so as to be able to slide with respect to the second casing between a first position in which the first and second contact pieces of the first and second optical fibres are spaced apart from each other, and a second position in which the said first and second contact pieces are mutually in contact;

the second contact piece is situated inside the movable optical contact in the form of a socket, which has, at its end directed towards the fixed optical contact, an entry convergence for guiding the first contact piece of the first optical fibre, and the first and second casings have abutment surfaces cooperating in order to limit the entry of the second casing into the first cavity of the first casing, so that, when the said abutment surfaces are mutually in contact and the movable optical contact is in its first position, the first contact piece is partially engaged in the entry convergence of the movable optical contact;

the second connector also comprises a wandering sub-assembly, which carries the said reserve of the said fluid and the said pumping means and which is able to move in the second cavity of the second casing in the direction of the connection-disconnection movement between a first position in which the said wandering sub-assembly is retracted in the second cavity of the second casing, and a second position in which it is partially emerged from the said second cavity;

the said wandering sub-assembly is coupled to the movable optical contact by an idle-movement connection and by a third spring so that, in a first part of the travel of the wandering sub-assembly in the direction of the connection movement, the movable optical contact is not driven by the said wandering sub-assembly and, in a second part of the said travel, the said wandering sub-assembly drives with it, by means of the third spring, the movable optical contact until the second contact piece of the second optical fibre comes into contact with the first contact piece of the first optical fibre;

the wandering sub-assembly comprises a body in which there are formed at least a first passage for the movable optical contact, a first chamber forming the said fluid reserve and a second, cylindrical, chamber which is connected to the first chamber by a second passage containing a first non-return valve allowing the fluid to pass only from the first to the second chamber, and a piston, provided with a second non-return valve, is disposed in the second chamber and divides the latter into a suction chamber, into which the said second passage opens out, and a delivery chamber which communicates with the said first passage through a third passage formed in the body of the wandering sub-assembly and with a chamber situated inside the movable optical contact in the form of a socket, in front of the second contact piece of the second optical fibre, by means of at least a fourth passage formed in the said movable optical contact;

the second non-return valve consists of a lip joint which surrounds the said piston and which allows the fluid to pass only from the suction chamber to the delivery chamber;

the piston is provided with a piston rod which extends in the delivery chamber and which projects outside the body of the wandering sub-assembly in the direction of the first connector and in alignment with the pusher of the first connector when the second casing is engaged in the first cavity in the first casing, and a fourth spring having lesser stiffness than the first spring is disposed in the suction chamber and forces the piston and the piston rod towards the said pusher, the said piston being actuated by the pusher when the wandering sub-assembly is moved from its first to its second position, and by the fourth spring when the wandering sub-assembly is moved from its second to its first position;

the second casing and the wandering sub-assembly of the second connector also comprises cooperating retention means for retaining the wandering sub-assembly in its first position in the second cavity of the second casing, and the second casing carries a control means which is actuated by the first casing when the said abutment surfaces of the first and second casings come into contact with each other, and which at this moment acts on the said retention means in order to put them in an inactive state such that the wandering sub-assembly can be moved from its first to its second position;

the second casing of the second connector has an anchoring ring made from elastomer material, which is fixed by one end to the second casing and which carries at its other end at least one anchoring element able to be attached behind a cooperating anchoring element formed on the first casing of the first connector when the said abutment surfaces of the first and second casings are mutually in contact;

to allow the movement of the wandering sub-assembly between its first and second positions, the second connector also comprises a manoeuvring ring which can slide on the second casing of the second connector and which is connected to the wandering sub-assembly in the second cavity by several radial connecting elements passing through oblong slots formed in the second casing;

the manoeuvring ring is sized and configured so as to closely surround the anchoring ring when the said manoeuvring ring is in a position corresponding to the second position of the wandering sub-assembly.

BRIEF DESCRIPTION OF THE DRAWINGS

Other characteristics and advantages of the invention will emerge more clearly during the following description of one embodiment given by way of example with reference to the accompanying drawings, in which.

DESCRIPTION OF THE PREFERRED EMBODIMENTS

Figure 4:
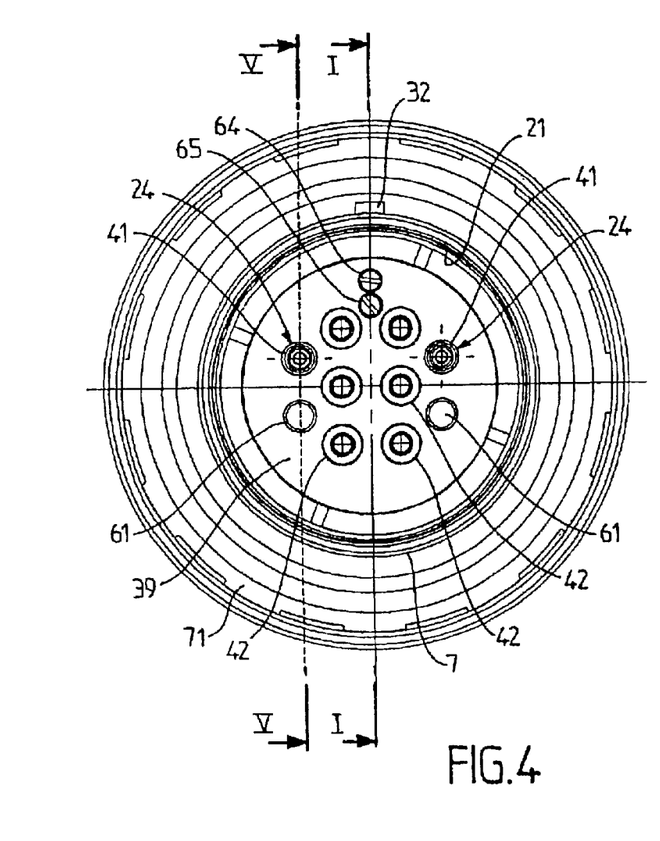
FIG. 4 is a view on end, also in the direction of the arrow F1 in FIG. 1, showing a second of the two connectors of the connection device according to the invention.
Figure 5:
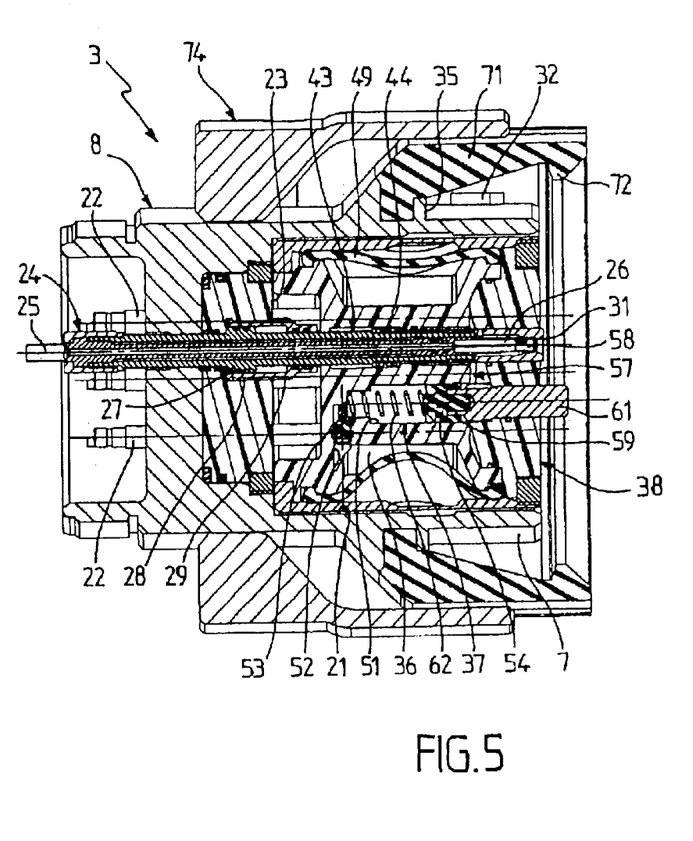
FIG. 5 is a view in section along the line V—V in FIG. 4.

Referring to FIGS. 1 to 5, a connection device according to the invention can be seen, produced in the form of a hybrid connection device, that is to say one having electrical contacts for making connections between electrical conductors and optical contacts for making connections between optical fibres. The connection device 1 comprises a first connector or male connector 2 (FIGS. 2 and 3) and a second connector or female connector 3 (FIGS. 4 and 5).

The male connector 2 comprises a fixed casing or base 4 provided with a flange 5 for fixing it, by means of screws or bolts, not shown, for example on a wall of an item of undersea equipment, such as a well head. The casing 4 has, in its end face turned towards the female connector 3, a cavity 6 which, in the example shown, has a circular cross-section, but whose cross-section could have any other required shape. The cavity 6 is intended to receive a part 7, with a corresponding circular cross-section, of the casing 8 of the female connector 3.

The casing 4 of the male connector 2 carries six electrical contact pins 9 and two fixed optical contacts 11, which project into the cavity 6 from the bottom 12 thereof. On the bottom 12 of the cavity 6 there also projects a cylindrical pusher 13 which can slide in a blind cylindrical hole 14 in the casing 4 and which is forced by a spring 15 in the direction of the female connector 3.

Each of the two optical contacts 11 has the shape of a socket in which there is fixed an optical fibre 16 terminating in a rigid contact piece 17, for example made from ceramic, which extends axially beyond the end of the optical contact 11 projecting into the cavity 6. In addition, each optical contact 11 carries a protective cowl 18 which, in the disconnected state of the connection device 1, covers the piece 17 and is at least partially filled with a fluid in the form of a gel having a refractive index equal to or very close to that of the optical fibre 16. The cowl 18, which is produced partly from metal and partly from elastomer material, is able to slide on the projecting end of the optical contact 11 when, as will be seen in detail below, it is subjected to a thrust directed towards the bottom 12 of the cavity 6 counter to the return force of a spring 16 which forces the cowl 18 towards the female connector 3. The cowl 18 has, in the region where it covers the free end of the piece 17, at least two contiguous lips 18a and 18b made from elastomer material, which can separate in order to allow the piece 17 to pass between them when the cowl 18 is pushed towards the bottom 12 of the cavity 6.

The part 7 of the casing 8 of the female connector 3 has, in its end face turned towards the male connector 2, a cavity 21, for example with a circular cross-section, which, in the connected state of the connection device, is open in the direction of the bottom 12 of the cavity of the male connector 2. The casing 8 of the female connector 3 rigidly carries six electrical contact elements 22 which project into the cavity 21 from the bottom 23 thereof and which, in the connected state of the two connectors 2 and 3, are respectively aligned with the contact pins 9 of the male connector 2.

Figure 10:
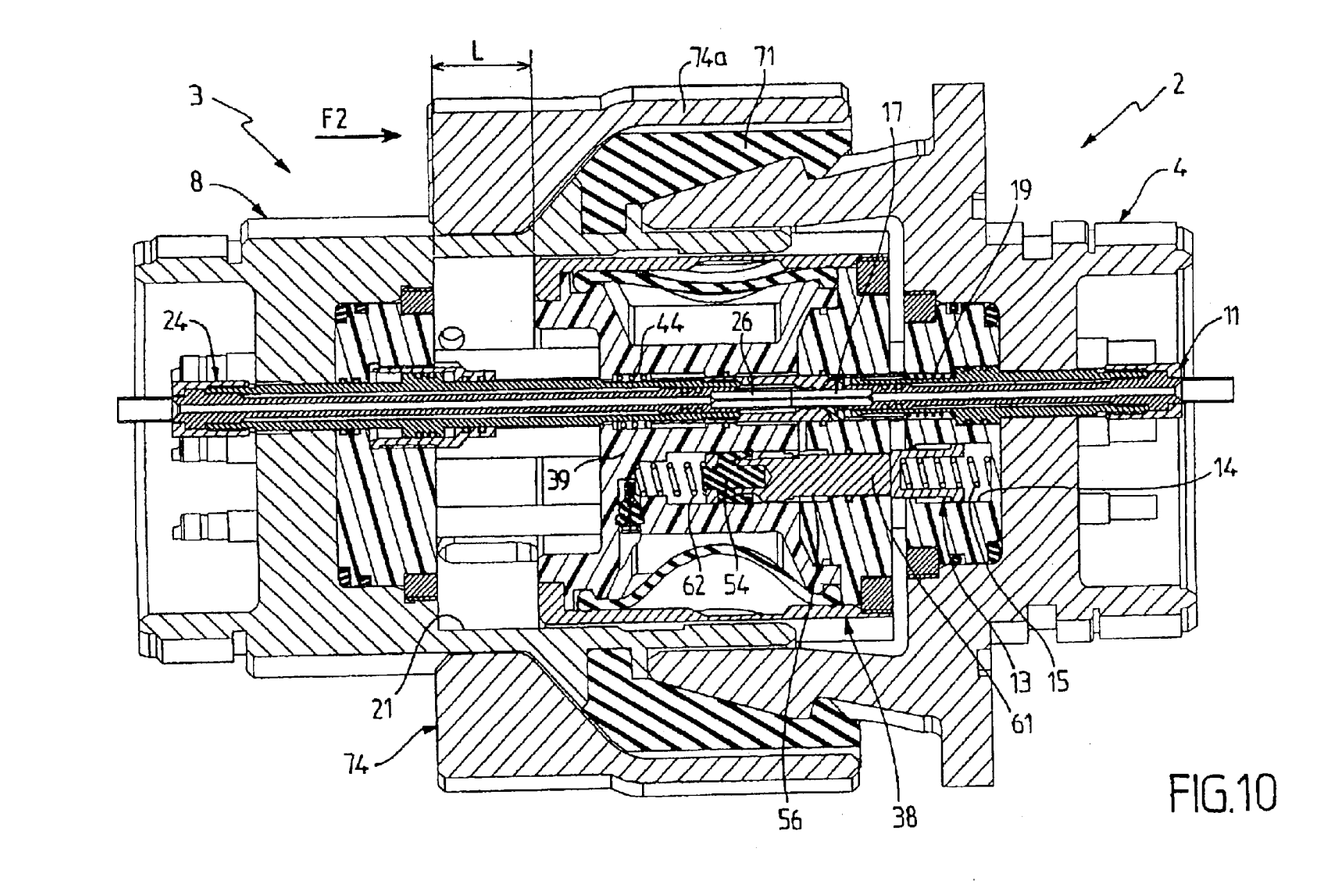
Figure 11:
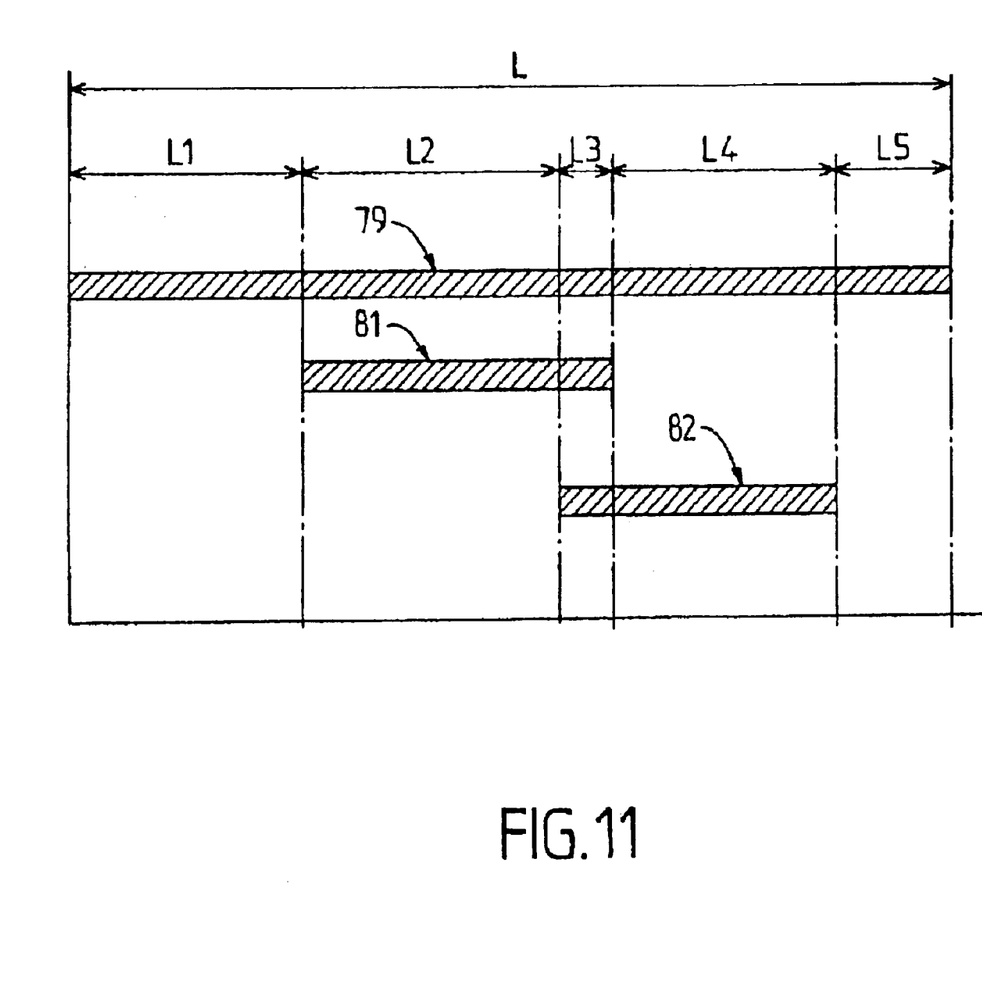
FIG. 11 is a diagram illustrating the relative travels of some of the movable elements of the connection device according to the invention during a connection process.

The casing 8 of the female connector 3 also carries two movable optical contacts 24 which also project into the cavity 21 and which, in the connective state of the two connectors 2 and 3, are respectively aligned with the two fixed optical contacts 11 of the male connector 2. Each of the two movable optical contacts 24 also has the shape of a socket in which there is fixed an optical fibre 25 provided with a rigid contact piece 26, for example made from ceramic. Each movable optical contact 24 can slide to a limited extent with respect to the casing 8 between a first position in which the contact pieces 17 and 26 of the mutually aligned optical fibres 16 and 25 are spaced apart from each other (FIG. 6), and a second position in which the contact pieces 17 and 26 of the optical fibres 16 and 25 are mutually in contact (FIG. 10). To this end, each movable optical contact 24 is provided, at its periphery, with a piston 27 which can slide in a blind cylindrical hole 28 which is formed in the bottom 23 of the cavity 21 of the casing 8 and which is closed off by an element in the form of a cylindrical bell 29 screwed into the blind hole 28.

As can be seen in particular in FIG. 5, the contact piece 26 of the optical fibre 25 is situated inside the corresponding movable optical contact 24 in the form of a socket and the latter, has, at its end directed towards the fixed optical contact 11 of the male connector 2, an entry convergence 31 which guides the contact piece 17 of the optical fibre 16 of the fixed optical contact 11 whilst it enters inside the corresponding movable optical contact 24 when the latter is moved from its first to its second position in a manner which will be described in detail below.

Given that, in the example embodiment described here, the cavity 6 in the casing 4 of the male connector 2 and the part 7 of the casing 8 of the female connector 3, which is intended to be fitted in the cavity 6, both have a circular cross-section, to allow correct alignment and unequivocal match between the contact pins 9 and the contact elements 22 on the one hand and between the fixed optical contacts 11 and the movable optical contacts 24 on the other hand, during a process of connecting the two connectors 2 and 3, the part 7 of the casing 8 can for example be provided with a locating pin 32 (FIGS. 1, 4 and 5) intended to be engaged in a notch 33 (FIG. 1) provided in the edge of the peripheral wall of the casing 4 surrounding the cavity 6.

Figure 7:
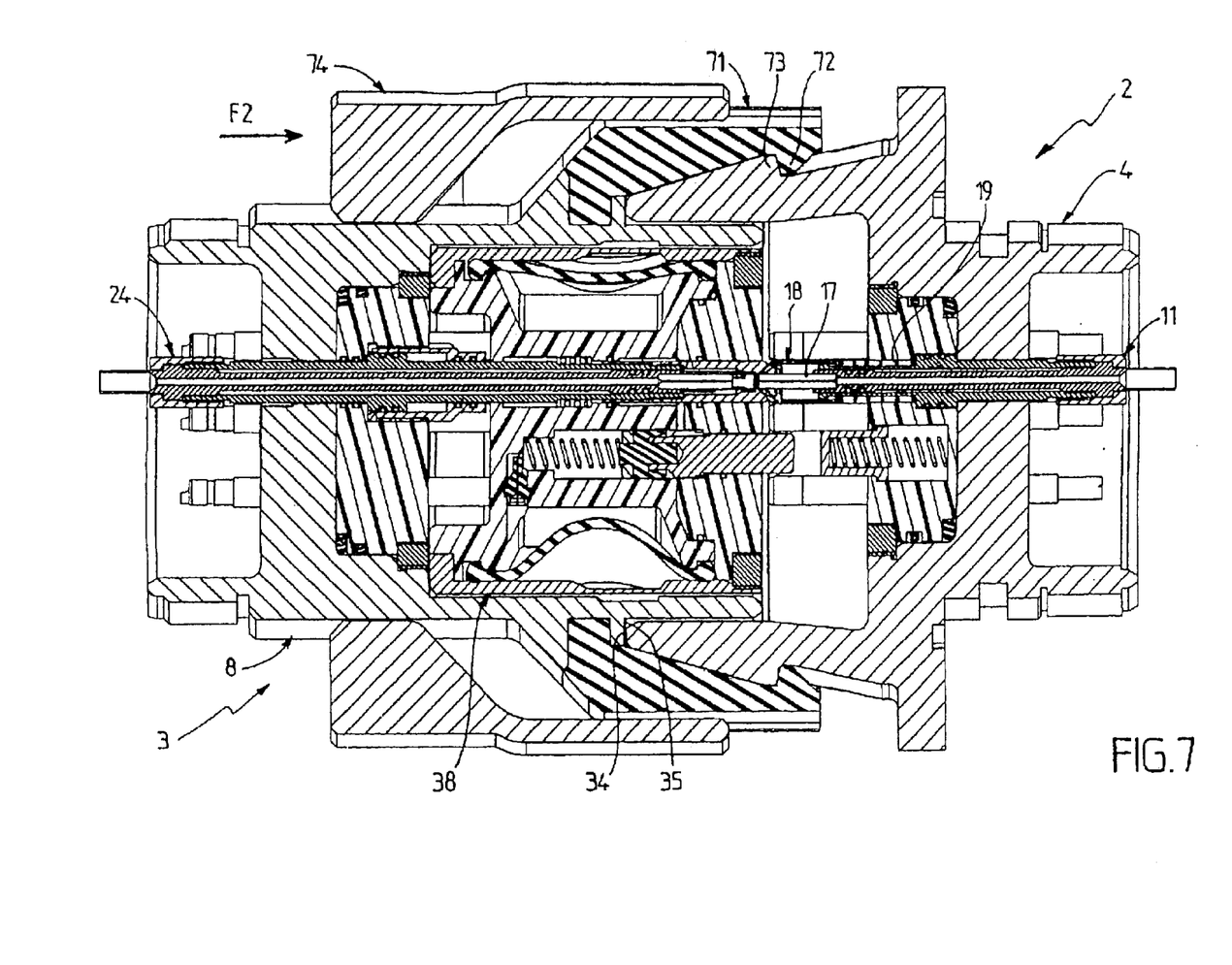
Figure 8:
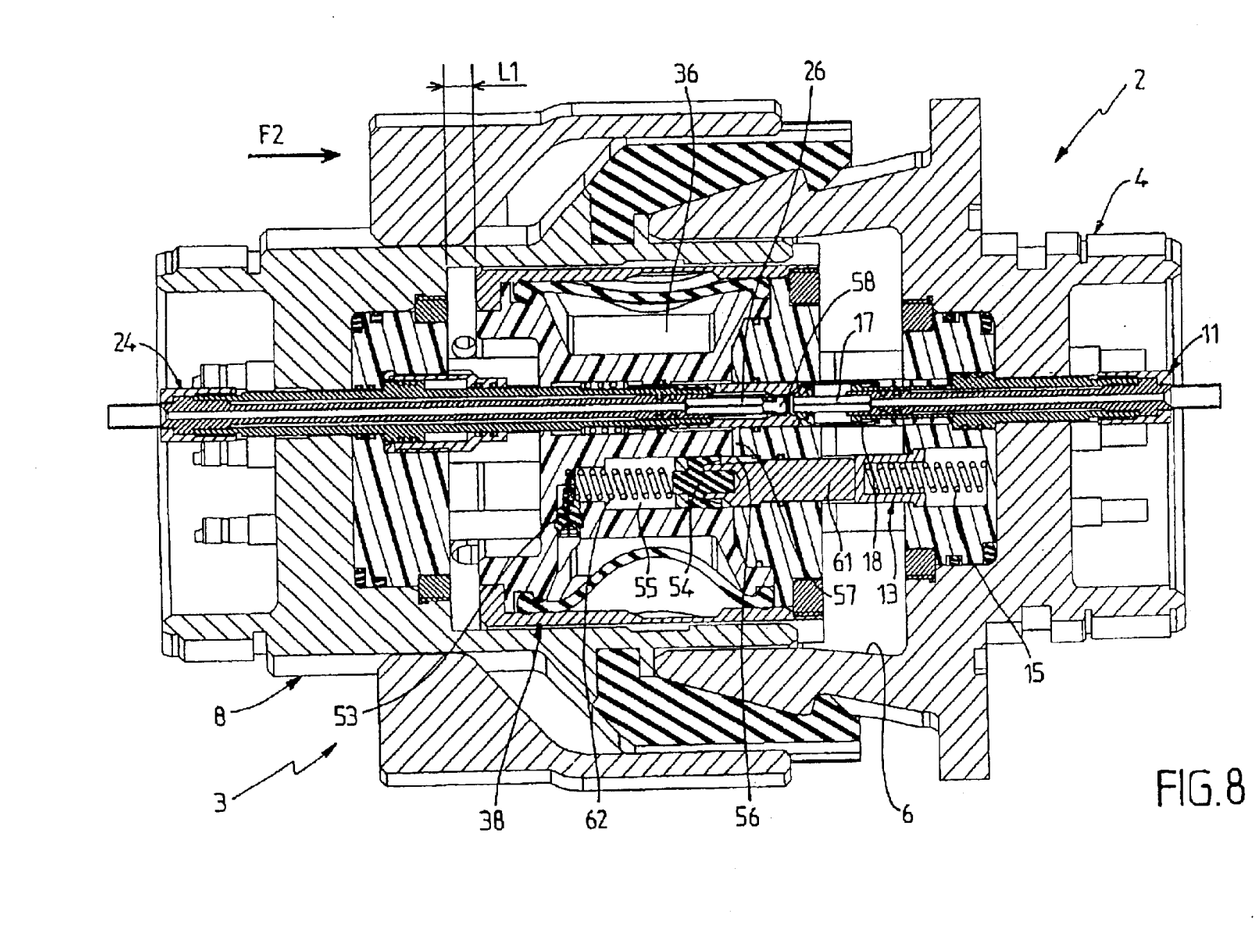

In addition, the two casings 4 and 8 of the connectors 2 and 3 have abutment surfaces 34 and 35 for limiting the penetration of the part 7 of the casing 8 in the cavity 6 of the casing 4. The abutment surface 35, produced for example in the form of a circular collar on the periphery of the part 8 of the casing 8, is positioned so that, when the two abutment surfaces 34 and 35 are mutually in contact and when the movable optical contacts 24 are in their first position, the contact piece 17 of the optical fibres 16 of the fixed optical contacts 11 are partially engaged respectively in the entry convergences 31 of the movable optical contacts 24 as shown in FIG. 7.

The female connector 3 carries a reserve 36 of a fluid (gel) having a refractive index equal to that of the optical fibres 16 and 25, and at least one pumping means 37, preferably two pumping means, which are associated respectively with the two movable optical contacts 24 in order, at each connection-disconnection movement of the connectors 2 and 3, to inject a certain quantity of fluid or gel into a space surrounding the front ends of the two contact pieces 17 and 26 of the optical fibres 16 and 25, in particular into the space 58 which is situated in front of the piece 26 inside the socket forming the movable optical contact 24. More precisely, the fluid reserve 36 and each of the two pumping means 37 are carried by a wandering sub-assembly 38 which is able to move in the cavity 21 of the casing 8 between a first position in which the said wandering sub-assembly is completely retracted inside the said cavity 21 (FIG. 1), and a second position in which it is partially emerged from the said cavity (FIG. 10).

The wandering sub-assembly 38 comprises a body 39, roughly cylindrical, which has two passages 41 passing through it from one end to the other, respectively for the two movable optical contacts 24, and six passages 42, respectively for the electrical contact elements 22. All the passages 41 and 42 extend parallel to the direction of the axis of the cylindrical body 39 of the wandering sub-assembly 38, that is to say parallel to the axis of the cavities 6 and 21 with a circular cross-section. In the passages 42 there are fixed electrical contact sockets (not shown) which are in sliding contact with the electrical contact elements 22 carried by the casing 8 of the female connector 3. When the part 7 of the casing 8 of the female connector 3 is fitted in the cavity 6 of the casing 4 of the male connector 2 and the wandering sub-assembly 38 is moved from its first to its above mentioned second position, the six contact sockets situated respectively in the six passages 42 slide over the six contact elements 22 and engage by sliding respectively on the six contact pins 11 of the male connector 2, thus establishing an electrical connection between each of the contact pins 9 and the corresponding contact element 22.

The body 39 of the wandering sub-assembly 38 is coupled to each of the two movable optical contacts 24 by an idle-movement connection 43 and by a spring 44. The coupling is such that, in a first part of the travel of the wandering sub-assembly 38 in the direction of the connection movement, each movable optical contact 24 is not driven by the body 39 of the wandering sub-assembly and, in a second part of the said travel, the body 39 drives with it the movable optical contact 24 by means of the spring 44 until the contact piece 26 of the optical fibre 25 comes into contact with the contact piece 17 of the optical fibre 16. After this the body 39 of the wandering sub-assembly 38 continues its travel alone by compressing the spring 44 until the wandering sub-assembly arrives in its above mentioned second position (FIG. 10).

Figure 6:
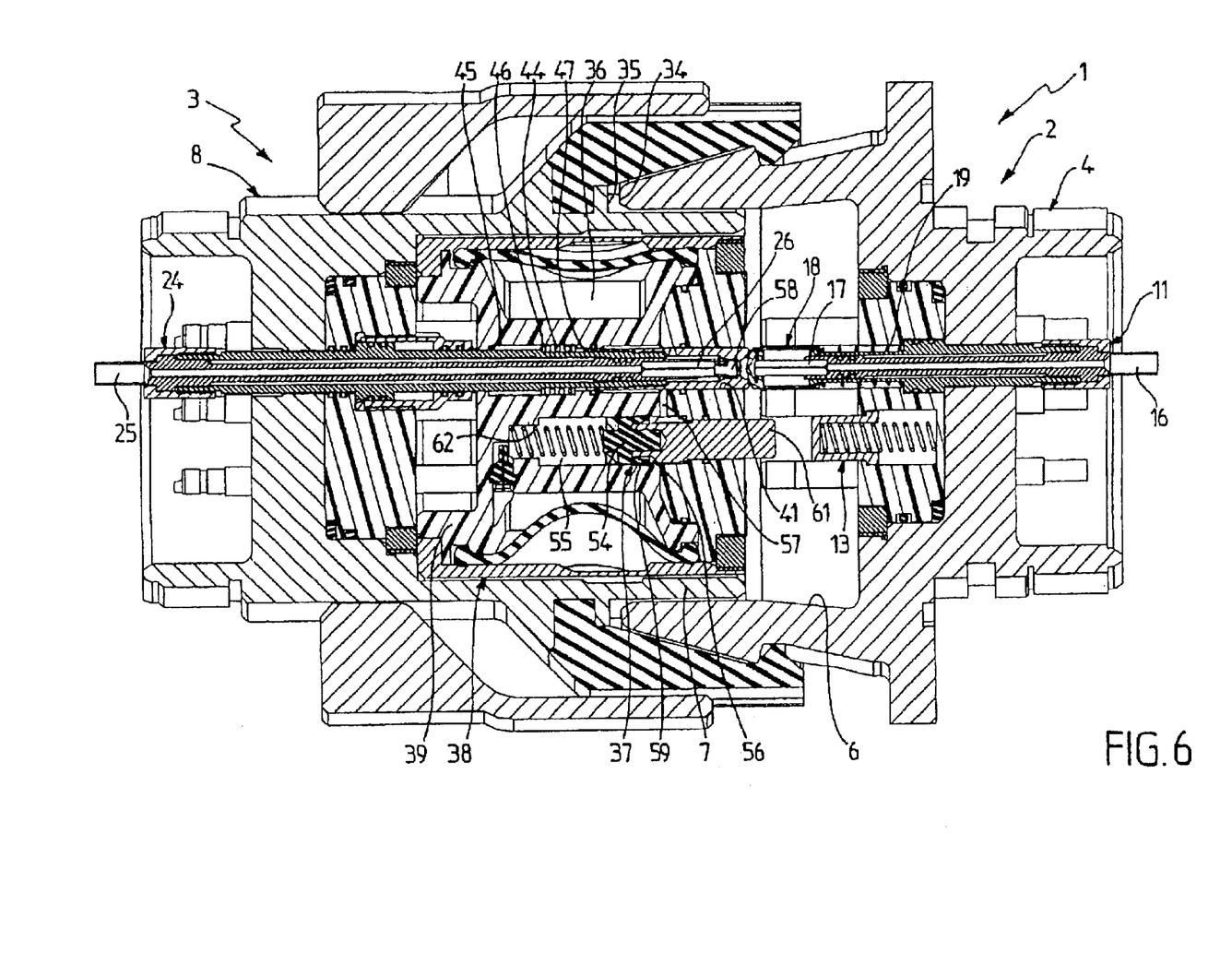
FIGS. 6 to 10 are views in longitudinal section of the two connectors of FIGS. 3 and 5, in the assembled state, the movable elements of the two connectors being depicted in various positions occupied during a connection process.

For this purpose, as can be seen more clearly in FIG. 6, in each passage 41 in the body 39 an annular shoulder 45 is provided which, in the first position of the wandering sub-assembly 38, is spaced apart from a washer 46 which can slide on the movable optical contact 24 and which is situated at one of the ends of the spring 44. The other end of the spring 44 can bear against an annular shoulder 47 formed at the periphery of the movable optical contact 24.

Referring once again to FIGS. 1 and 5, it can be seen that the body 39 of the wandering sub-assembly 38 has, in its cylindrical external surface, a peripheral groove 48 which is covered sealingly by a membrane 49 made from elastomer material. The groove 48 and the membrane 49 form together a chamber which contains the fluid or gel having the same refractive index as the optical fibres 16 and 25, and which constitutes the said fluid reserve 36. The membrane 49 made from elastomer material balances the pressures prevailing on each side of the said membrane, that is to say in the fluid reserve 36 and in the space surrounding the connection device 1.

The body 39 of the wandering sub-assembly 38 also has, for each pumping means 37, a cylindrical chamber 51 whose axis lies parallel to the axes of the passages 41 and 42. At one of its ends, this chamber 51 is in communication with the fluid chamber or reserve 36 through a passage 52 in which there is disposed a non-return valve 53 which allows the fluid to pass solely from the chamber 36 to the chamber 51. A piston 54 is disposed in the chamber 51 and divides the latter into a suction chamber 55 (FIG. 6), into which the passage 52 opens out, and a delivery chamber 56. This chamber 56 communicates with the passage 41, in which the movable optical contact 24 is situated, through a passage 57 formed in the body 39 of the wandering sub-assembly 38 and with the chamber 58 situated inside the movable optical contact 24, in front of the contact piece 26, through several passages formed radially and longitudinally in the movable optical contact in the form of a socket, so that the passage 57 and the chamber 58 remain in communication continuously, whatever the position of the movable optical contact 24 in the passage 41 of the body 39.

The piston 54 is provided with a non-return valve which allows the fluid to pass solely from the suction chamber 55 to the delivery chamber 56. This non-return valve can for example consist of a lip joint 59 made from elastomer material, which surrounds the piston 54. In addition, the piston 54 is provided with a piston rod 61, which extends in the delivery chamber 55 and which projects outside the body 39 of the wandering sub-assembly 38 in the direction of the male connector 2 and in alignment with the pusher 13 of the latter when the part 7 of the casing 8 of the female connector 3 is engaged in the cavity 6 of the casing 4 of the male connector 2. A spring 62 disposed in the suction chamber 55 forces the piston 55 and the piston rod 61 towards the pusher 13. The spring 62 has a lesser stiffness than the spring 15 associated with the pusher 13, so that the piston 54 is actuated by the pusher 13 when the latter comes into contact with the piston rod 61 during the movement of the wandering sub-assembly 38 from its first to second above mentioned positions. The pusher 13 has an outside diameter greater than that of the piston rod 31 and greater than the inside diameter of the bore of the body 39 in which the said piston rod slides.

Figure 1:
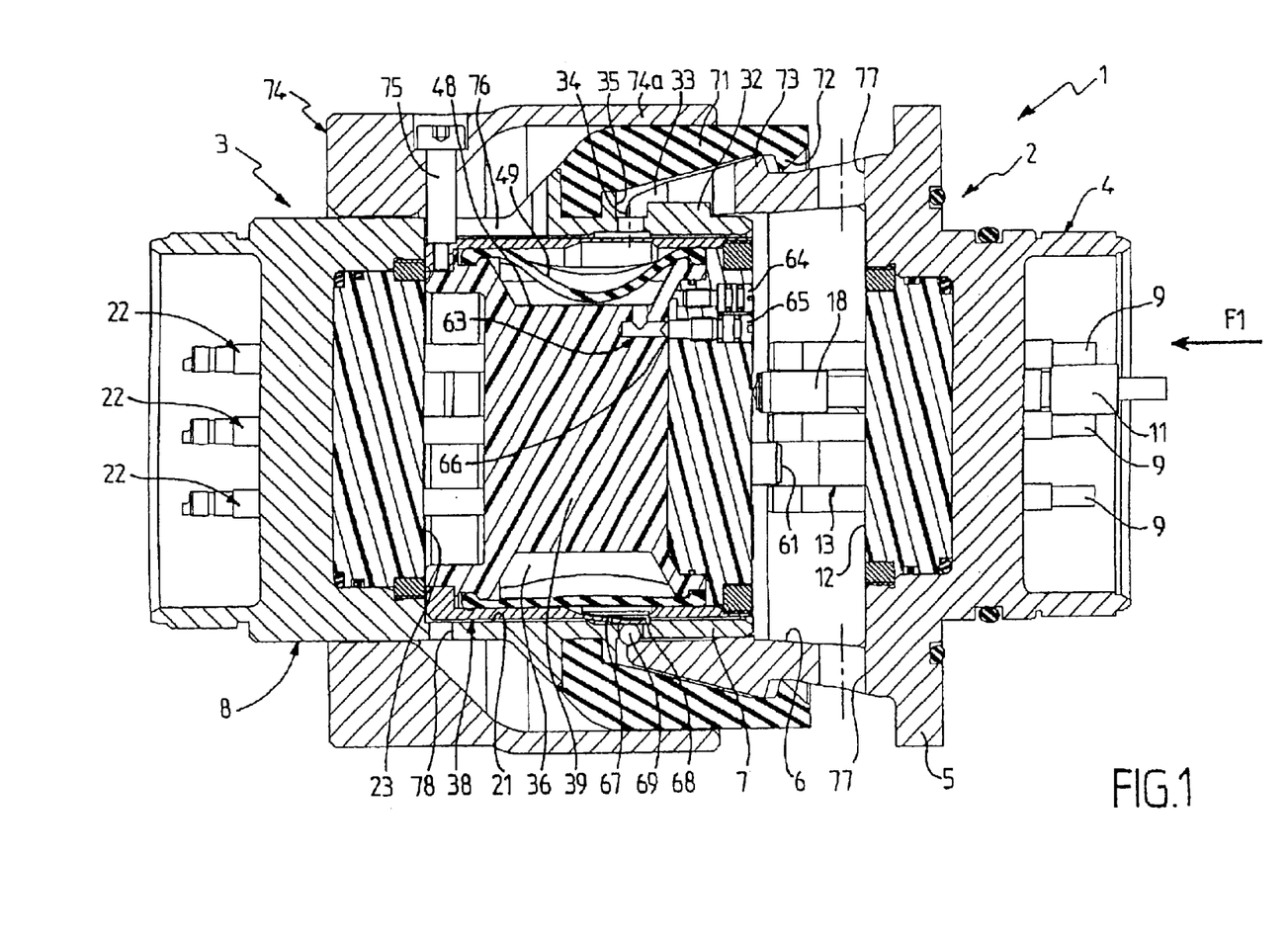
FIG. 1 is a view in axial section of a hybrid (electrical and optical) connection device in accordance with the present invention, the two connectors of the connection device being depicted in the assembled state.
Figure 2:
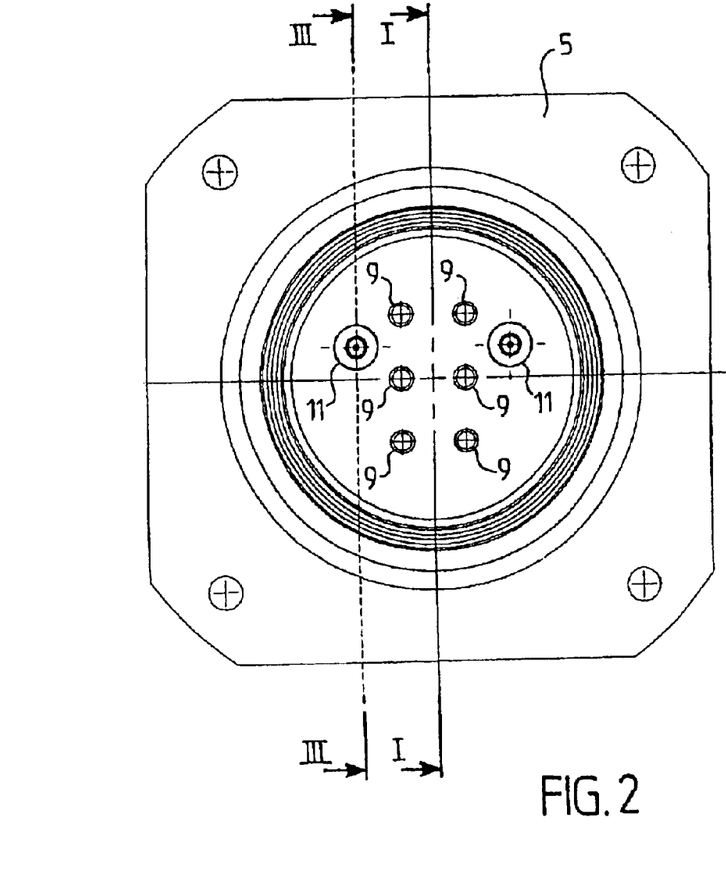
FIG. 2 is a view in the direction of the arrow F1 in FIG. 1, showing a first one of the two connectors of the connection device, seen on end.
Figure 3:
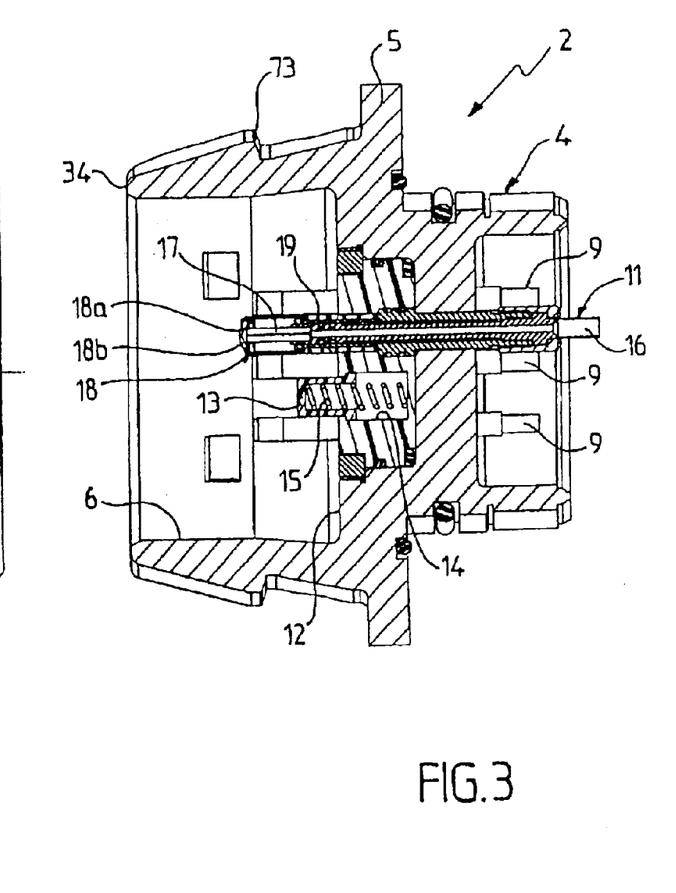
FIG. 3 is a view in axial section along the line III—III in FIG. 2.

When the connection device 1 according to the invention is in the connected state, the fluid reserve 36 can be filled with fluid for the first time or it can be refilled subsequently if needed through filling channels which are formed in the body 39 of the wandering sub-assembly 38 and which are designated in general terms by the reference 63 in FIG. 1. In operation, these filling channels are closed off by a screw 64, which serves as a plug, and by a needle screw 65 which serves as a valve in combination with a seat 66 formed in the body 39. For filling the fluid reserve 36, the screw 64 is removed and a feed tube equipped with a screw coupling is screwed in place of the screw 64, and then the screw 65 is slightly unscrewed in order to move it away from the seat 66. After this, a fluid or gel with a refractive index equal to that of the fibres 16 and 25 is injected into the fluid reserve 36 through the feed tube and the filling channels 63. Once the fluid reserve 36 is filled, the screw 65 is tightened against the seat 66, the screw coupling of the feed tube is detached and the screw 64 is refitted.

Preferably the casing 8 of the female connector 3 and the wandering sub-assembly 38 have cooperating retention means for retaining the wandering sub-assembly in its first position, that is to say in its position completely retracted in the cavity 21 of the casing 8, as long as the part 7 of this casing 8 has not been engaged in the cavity 6 of the casing 4 of the male connector 2. To this end, as shown in FIG. 1, the wandering sub-assembly 38 has at least one flexible tongue 67 projecting on its peripheral surface, the said tongue engaging in a recess 68 formed in the internal cylindrical surface of the cavity 21 of the casing 8 in order to retain the wandering sub-assembly 38 in the said cavity 21. In addition, the casing 8 carries a control means, for example a ball 69, which is actuated by the casing 8 of the male connector 2 when the abutment surfaces 34 and 35 of the casings 4 and 8 arrive mutually in contact, in order to push the flexible tongue 67 out of the recess 68 and thus allow the movement of the wandering sub-assembly 38 from its first position completely retracted in the cavity 21 towards its second position partially emerged from the said cavity.

The casing 8 of the female connector 3 can also comprise an anchoring ring 71 made from elastomer material, able to maintain the two casings 4 and 8 in their assembled state after their abutment surfaces 34 and 35 have come into contact with one another. The anchoring ring 71 is fixed by one end to the casing 8 and carries, at its other end, at least one anchoring element 72 able to hook on behind a cooperating anchoring element 73 formed on the peripheral surface of the casing 8 of the male connector 2 when the abutment surfaces 34 and 35 are in contact. The anchoring elements 72 and 73 can for example consist of circular rims formed respectively on the internal peripheral surface of the ring 71 and on the external peripheral surface of the casing 4. However, at least one of the two rims 72 and 73 could be replaced by several anchoring elements evenly distributed over the internal periphery of the ring 71 or on the external periphery of the casing 4.

To allow the movement of the wandering sub-assembly 38 from its first to its second position and vice-versa when the casings 4 and 8 of the two connectors 2 and 3 have been assembled, the connector 3 also carries a manoeuvring ring 74 which can slide on the casing 8 and which is connected to the wandering sub-assembly 38 by several radial screws 75, for example three screws angularly spaced apart by 120°. Each screw 75 passes through an oblong slot 76 formed in the cylindrical wall of the casing 8 and opening out into the cavity 21 therein. Preferably, the manoeuvring ring 74 is extended on one side by a cylindrical skirt 74a which is sized and configured so as to closely surround the anchoring ring 71 when the manoeuvring ring 74 is in a position corresponding to the second position of the wandering sub-assembly 38, as shown in FIG. 10. In this position, the skirt 78a of the manoeuvring ring 74 prevents the ring 71 from expanding radially outwards, so that the two connectors 2 and 3 are firmly held in their connected state.

Where the connection device 1 is intended to be used in a liquid environment, for example an undersea environment, and therefore in a non-compressible fluid, openings 77 can be provided in the casing 4 and openings 78 can be provided in the casing 8, in addition to the slots 76, to allow balancing of the pressures on the two sides of the wandering sub-assembly 38 in the cavities 6 and 21. Likewise, orifices (not shown) can be provided for balancing the pressures on the two sides of the piston 27 of each movable optical contact 24.

The functioning of the connection device 1 described above will now be described making reference to FIGS. 6 to 11, FIG. 11 illustrating the respective travels of the wandering sub-assembly 38, the piston 54 of the pumping means 37 and each of the two movable optical contacts 24 during a process of connection or disconnection. More precisely, in FIG. 11, the shaded band 79 of total length L represents the travel of the wandering sub-assembly 38, the shaded band 81 represents the travel of the piston 54 and the shaded band 82 represents the travel of the movable optical contact 24.

FIG. 6 depicts the connection device 1 during the engagement of the part 7 of the casing 8 of the female connector 3 in the cavity 6 of the casing 4 of the male connector 2, at a time when the front end of the cowl 18 covering the contact piece 17 comes into contact with the front end of the movable optical contact 24, a little before the abutment surfaces 34 and 35 of the casings 4 and 8 come into contact with each other.

FIG. 7 shows the state of the connection device 1 after the abutment surfaces 34 and 35 have come into contact with each other and the rim 72 on the anchoring ring 71 has come to be hooked on behind the rim 73 on the casing 4. At this moment, the cowl 18 has been slightly pushed back, counter to the return force of the spring 19, by the front end of the movable optical contact 24, so that the front end of the contact piece 17 is kept exposed and partially engaged in the entry convergence 31 of the movable optical contact 24. At the same time, the casing 4 has acted on the ball or balls 69 (FIG. 1) which push back the flexible tongue or tongues 67 radially inwards in order to make them emerge from the recess 68 in the casing 8. The wandering sub-assembly 38 can then be moved from the position depicted in FIG. 7 to the position depicted in FIG. 10 by exerting a thrust on the manoeuvring ring 74 in the direction of the arrow F2.

After the wandering sub-assembly 38 has moved by a quantity L1 (FIGS. 8 and 11) from the position depicted in FIG. 7, the piston rod 61 encounters the pusher 13. As from this moment, when the wandering sub-assembly 38 continues to move in the direction of the arrow F2, as the spring 15 has a greater stiffness than the spring 62, the pusher 13 pushes the piston 54 in the suction chamber 55. However, the valve 53 prevents the fluid or gel contained in the suction chamber 55 from returning to the reserve of gel 36, and the lip joint 59 of the piston 54 allows the gel to pass to the delivery chamber 56 and, from there, through the passage 57, to the chamber 58 situated inside the movable optical contact 24, between the two contact pieces 17 and 26. By passing through the chamber 58, the gel cleans the front surfaces of the contact pieces 17 and 26 and drives out any polluted environment, for example polluted sea water, which may be in the chamber 58, to the cavity 6 in the casing 4 through the entry convergence 31 of the movable optical contact 24 and passages provided for this purpose between the front faces of the said movable optical contact and of the cowl 18.

When the wandering sub-assembly 38 has moved by an additional distance L2 following the distance L1 (FIGS. 9 and 11), a little before the front face of the wandering sub-assembly 38 encounters the front face of the pusher 13, the annular shoulder 45 on the body 39 of the wandering sub-assembly 38 encounters the washer 46 and begins to push the movable optical contact 24 by means of the spring 44 towards the fixed optical contact 11. During this movement, the contact pieces 17 and 26 move closer to each other, and the movable optical contact 24 pushes the cowl 18 whilst compressing the spring 19.

Figure 9:
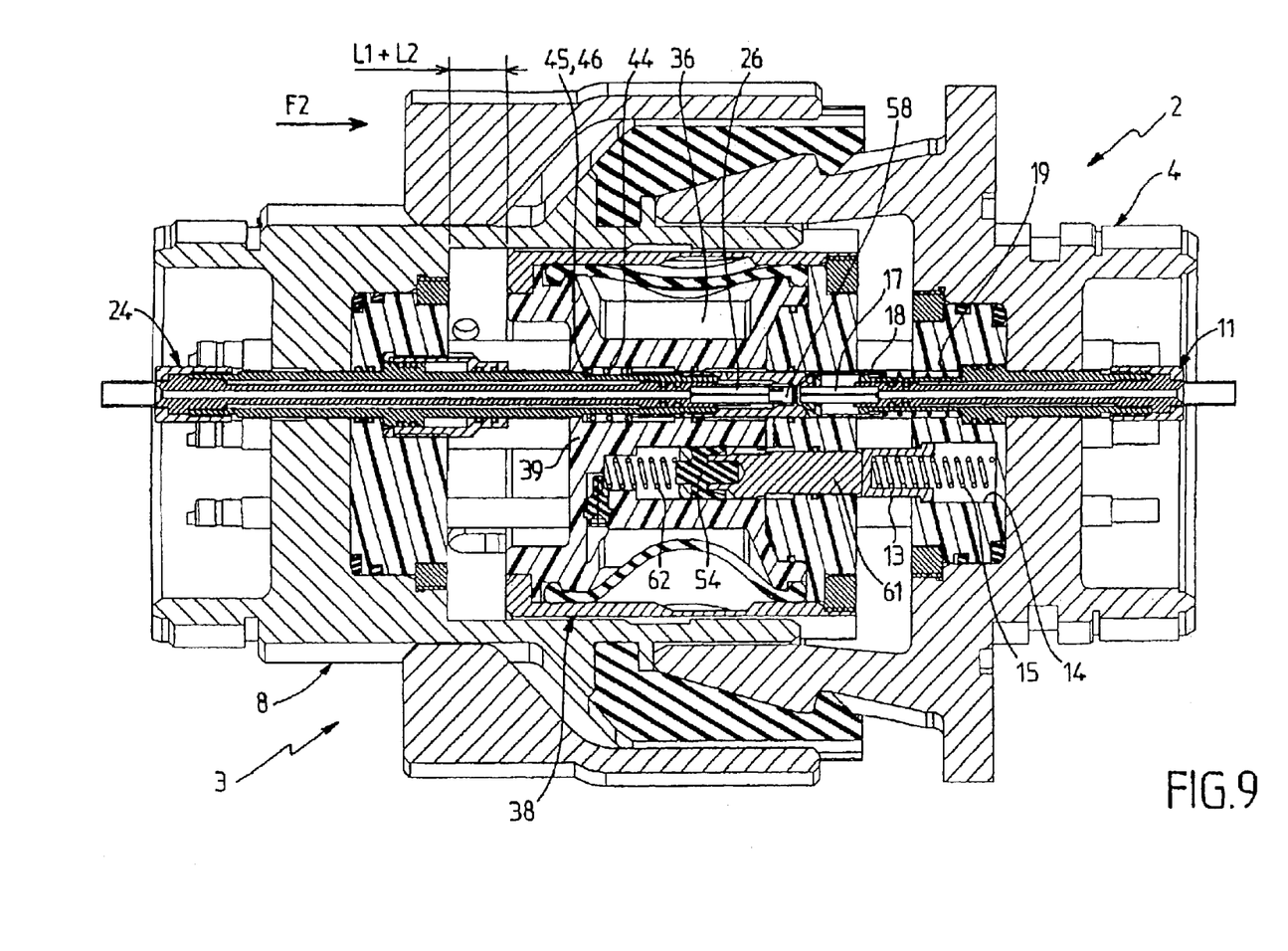

When the wandering sub-assembly 38 has also moved by an additional distance L3 following the distances L1 and L2 (FIG. 11), the front face of the body 39 of the wandering sub-assembly 38 encounters the front face of the pusher 13. As from this moment, the piston 54 ceases to move with respect to the body 39 of the wandering sub-assembly 38, so that the gel ceases to be injected into the space 58 between the two contact pieces 17 and 26. Whilst the wandering sub-assembly 38 continues to move in the direction of the arrow F2, its front face pushes the pusher 13 in the cavity 14 of the casing 4, counter to the return force of the spring 15 (FIGS. 9 and 10). During this time, the piston rod 61 is held in contact with the pusher 13 by the spring 62.

After the wandering sub-assembly 38 has moved by an additional distance L4 following the distances L1, L2 and L3, the two contact pieces 17 and 26 come into contact with each other. As from this moment the movable optical contact 24 ceases to be moved by the wandering sub-assembly 38, which pursues its travel alone over a distance L5 whilst compressing the springs 15 and 44, until the manoeuvring ring 74 encounters the anchoring ring 71 and the extension 74a of the said manoeuvring ring completely surrounds the anchoring ring, as shown in FIG. 10. At this moment the connection process is complete.

The two contact pieces 17 and 26 are now pressed against one another by the spring 44, and any slight interstice which may remain between them is filled in by the gel present in the chamber 58.

Conversely, during a disconnection process, starting from the state depicted in FIG. 10, the manoeuvring ring is moved in the opposite direction to the arrow F2 and drives with it the wandering sub-assembly 38 in the same direction. Whilst the wandering sub-assembly 38 moves by the distance L5, the springs 15 and 44 are decompressed. At the same time or thereafter, the spring 19 and the cowl 18 push the movable optical contact 24 so that the contact piece 26 separates from the contact piece 17.

After the wandering sub-assembly 38 has travelled the distance L5+L4 in the opposite direction to the arrow F2, the pusher 13 arrives in the end of travel position in the cavity 14, so that the front face of the body 39 of the wandering sub-assembly 38 separates from the front face of the pusher 13, but the piston rod 61 remains in contact with the pusher 13 under the thrust of the spring 62. Consequently, as from this moment, an additional movement of the wandering sub-assembly 38 over the distance L3+L2 in the opposite direction to the arrow F2 produces a relative movement of the piston 54 with respect to the body 39 from the suction chamber 55 to the delivery chamber 56. As a result the gel is sucked into the reserve of gel 36 through the passage 52 and the non-return valve 53 and enters the suction chamber 55. Simultaneously, the gel which is situated in the delivery chamber 56 is driven by the piston 54 through the passage 57 as far as the chamber 58 and the entry convergence 31 of the movable optical contact 24, between the two contact pieces 17 and 26 which separate from each other, thus relining this space 58 and the entry convergence with gel. This action of pumping the gel by the piston 54 continues until the said piston reaches its end of travel position in the delivery chamber 56 and, the wandering sub-assembly 38 continuing its travel in the opposite direction to the arrow F2 over the distance L1, the front face of the piston rod 61 separates from the front face of the pusher 13.

When the wandering sub-assembly 38 has made its total travel L (L=L5+L4+L3+L2+L1), the casing 8 of the female connector 3 can then be separated from the casing 4 of the male connector 2 by exerting a traction on the casing 8 in the opposite direction to the arrow F2. At the start of the separation movement of the casing 8 with respect to the casing 4, the anchoring ring 71 splays out by deforming elastically so that the rim 72 on the ring 71 passes the rim 73 on the casing 4. At the same time, the casing 4 ceases to act on the ball or balls 69, which can then move radially outwards under the thrust of the flexible tongue or tongues 67. The latter then engage in the recess 68 in the casing 8, thus holding the wandering sub-assembly 38 in the position depicted in FIGS. 1 and 6.

Whilst the casing 8 of the female connector 3 separates from the casing 4 of the male connector 2, the cowl 18, pushed by the spring 19, comes to cover the front end of the contact piece 17. In closing again, the two lips 18a and 18b of the cowl 18 trap part of the gel which was situated in the entry convergence 31, and a certain quantity of gel also remains in the space 58, inside the socket of the movable optical contact 24 in front of the contact piece 26. As a result the two contact pieces 17 and 26 remain isolated from the polluted environment surrounding the connection device 1 after separation of the two connectors 2 and 3.

It should be noted that, before the first use of the connection device 1, gel may be introduced manually into the cowl 18 between the lips 18a and 18b thereof and gel may also be introduced manually into the space 58 either by direct injection through the entry convergence 31 of the movable optical contact 24, or from the reserve 36 by manually exerting pressure on the piston rod 61 and releasing it.

According to the above, it can therefore be seen that the two contact pieces 17 and 26 and the corresponding ends of the fibres 16 and 25 are protected by the gel contained in the space 58 and in the cowl 18 against any attack by the environment surrounding the connection device 1, both before, during and after any process of connection or disconnection of the two connectors 2 and 3. In addition, in the connected state of the two connectors 2 and 3, the gel provides optical continuity between the two contact pieces 17 and 26 should the slightest interstice remain between them.

It goes without saying that the embodiment of the invention which has been described above was given by way of purely indicative and in no way limiting example, and that many modifications may easily be made by a person skilled in the art without departing from the scope of the invention. Thus, in particular, although the invention has been described particularly with regard to a hybrid connection device, it does of course also apply to a connection device having solely optical contacts for optical fibres. In additions the number of optical contacts on each of the two connectors 2 and 3 is not necessarily equal to two but may be greater or lesser than two.

What is claimed is:

1. Connection device for optical fibres, comprising a first connector (2) intended to be associated with at least a first optical fibre (16) and a second connector (3) intended to be associated with at least a second optical fibre (25) which is to be connected to the first fibre, characterised in that one (3) of the two connectors (2, 3) carries a reserve (36) of a fluid having a refractive index equal to that of the optical fibres, and at least one pumping means (37) which is connected to said fluid reserve and which, in service, can be actuated in response to the connection and disconnection movements of the two connectors (2, 3) in order, at each connection/disconnection movement, to inject fluid into a space (58) surrounding the front ends of the two fibres bringing them closer together or spacing them apart, wherein the first connector (2) comprises a first fixed casing or base (4) which has, in its end face turned towards the second connector (3), a first cavity (6) which is open towards said second connector and on the bottom (12) of which there project on the one hand at least one fixed optical contact (11) in the form of a socket, in which the first optical fibre (16) is fixed, and on the other hand at least one pusher (13) forced by a first spring (15) towards the second connector (3), wherein the second connector (3) comprises a second moving casing or plug (8), which can be fitted in the first cavity (6) of the first casing (4) and which has, in its end face turned towards the first connector (2), a second cavity (21) which is open towards said first connector and which contains at least one movable optical contact (24) in the form of a socket, in which the second optical fibre (25) is fixed, which is provided with a second rigid contact piece (26), wherein the second connector (3) also comprises a wandering sub-assembly (38), which carries said reserve (36) of said fluid and said pumping means (37) and which is able to move in the second cavity (21) of the second casing (8) in the direction of the connection-disconnection movement between a first position in which said wandering sub-assembly is retracted in the second cavity of the second casing, and a second position in which it is partially emerged from said second cavity, and wherein the wandering sub-assembly (38) comprises a body (39) in which there are formed at least a first passage for the movable optical contact (24), a first chamber forming said fluid reserve (36) and a second, cylindrical, chamber (51) which is connected to the first chamber by a second passage (52) containing a first non-return valve (53) allowing the fluid to pass only from the first to the second chamber, and in that a piston (54), provided with a second non-return valve, is disposed in the second chamber (51) and divides the latter into a suction chamber (55), into which said second passage (52) opens out, and a delivery chamber (56) which communicates with said first passage through a third passage (57) formed in the body (39) of the wandering sub-assembly (38) and with the space (58) situated inside the movable optical contact (24) in the form of a socket, in front of the second contact piece (26) of the second optical fibre (25), by means of at least a fourth passage formed in said movable optical contact.

2. Connection device according to claim 1, characterised in that the first optical fibre (16) is provided with a first rigid contact piece (17) which extends axially beyond the end of the fixed optical contact (11) projecting in said first cavity (6), and in that the fixed optical contact (11) carries a protective cowl (18) which, in the disconnected state of the connection device (1), covers said first contact piece (17) and is at least partially filled with said fluid.

3. Connection device according to claim 2, characterised in that the protective cowl (18) can slide on the fixed optical contact (11) and has, in the region where it covers the free end of the first contact piece (17), at least two contiguous lips (18a, 18b) made from elastomer material, which can separate in order to allow the said first contact piece to pass when the protective cowl is subjected to a thrust directed in the direction of the connection movement of the second connector (3) towards the first connector (2), counter to the force of a second spring (19) forcing the said protective cowl towards the second connector.

4. Connection device according to claim 2, wherein said movable optical contact (24) is aligned axially with the fixed optical contact (11) of the first casing (4) when the second casing (8) is fitted in the first cavity of the first casing (4), and is mounted so as to be able to slide with respect to the second casing (8) between a first position in which the first and second contact pieces (17 and 26) of the first and second optical fibres (16 and 25) are spaced apart from each other, and a second position in which said first and second contact pieces are mutually in contact.

5. Connection device according to claim 4, characterised in that the second contact piece (26) is situated inside the movable optical contact (24) in the form of a socket, which has, at its end directed towards the fixed optical contact (11), an entry convergence (31) for guiding the first contact piece (17) of the first optical fibre (16), and the first and second casings (4, 8) have abutment surfaces (34, 35) cooperating in order to limit the entry of the second casing (8) into the first cavity (6) of the first casing (4), so that, when the said abutment surfaces are mutually in contact and the movable optical contact (24) is in its first position, the first contact piece (17) is partially engaged in the entry convergence (31) of the movable optical contact (24).

6. Connection device according to claim 1, characterised in that said wandering sub-assembly (38) is coupled to the movable optical contact (24) by an idle-movement connection (43) and by a third spring (44) so that, in a first part (L1+L2) of the travel (L) of the wandering sub-assembly (38) in the direction of the connection movement, the movable optical contact (24) is not driven by said wandering sub-assembly and, in a second part (L3+L4) of said travel, said wandering sub-assembly drives with it, by means of the third spring (44), the movable optical contact (24) until the second contact piece (26) of the second optical fibre (25) comes into contact with a first contact piece (17) of the first optical fibre (16).

7. Connection device according to claim 1, characterised in that the second non-return valve consists of a lip joint (59) which surrounds said piston (54) and which allows the fluid to pass only from the suction chamber (55) to the delivery chamber (56).

8. Connection device according to claim 1, characterised in that the piston (54) is provided with a piston rod (61) which extends in the delivery chamber (56) and which projects outside the body (39) of the wandering sub-assembly (38) in the direction of the first connector (2) and in alignment with the pusher (13) of the first connector when the second casing (8) is engaged in the first cavity (6) in the first casing (4), and in that a fourth spring (62) having lesser stiffness than the first spring is disposed in the suction chamber (55) and forces the piston (54) and the piston rod (61) towards said pusher (13), said piston being actuated by the pusher when the wandering sub-assembly is moved from its first to its second position, and by the fourth spring (62) when the wandering sub-assembly is moved from its second to its first position.

9. Connection device according to claim 5, characterised in that the second casing (8) and the wandering sub-assembly (38) of the second connector (3) also comprises cooperating retention means (67, 68) for retaining the wandering sub-assembly (38) in its first position in the second cavity (21) of the second casing (8), and the second casing carries a control means (69) which is actuated by the first casing (4) when said abutment surfaces (34, 35) of the first and second casings (4, 8) come into contact with each other, and which at this moment acts on said retention means (67, 68) in order to put them in an inactive state such that the wandering sub-assembly (38) can be moved from its first to its second position.

10. Connection device according to claim 5, characterised in that the second casing (8) of the second connector (3) has an anchoring ring (71) made from elastomer material, which is fixed by one end to the second casing and which carries at its other end at least one anchoring element (72) able to be attached behind a cooperating anchoring element (73) formed on the first casing (4) of the first connector (2) when the said abutment surfaces (34, 35) of the first and second casings are mutually in contact.

11. Connection device according to claim 10, characterised in that, to allow the movement of the wandering sub-assembly (38) between its first and second positions, the second connector (3) also comprises a manoeuvring ring (74) which can slide on the second casing (8) of the second connector and which is connected to the wandering sub-assembly (38) in the second cavity (21) by several radial connecting elements (75) passing through oblong slots (76) formed in the second casing.

12. Connection device according to claim 11, characterised in that the manoeuvring ring (74, 74a) is sized and configured so as to closely surround the anchoring ring (71) when said manoeuvring ring is in a position corresponding to the second position of the wandering sub-assembly (38).

13. A connection device for optical fibers, comprising:
- a first connector (2) associated with a first optical fiber (16) and a second connector (3) associated with a second optical fiber (25) that is to be connected to the first fiber;
- a reserve (36) of a fluid having a refractive index equal to that of the optical fibers that are to be connected, and a pump (37) that is connected to said reserve (36) and that injects the fluid into a space (58) at front ends of said first and second fibers;
- said first connector (2) comprising a first casing (4) that has a first cavity (6) that is open towards said second connector and on a bottom (12) of which is a first optical contact (11) in which said first optical fiber (16) is fixed and a pusher (13) forced by a first spring (15) towards said second connector (3);
- said second connector (3) comprising a second casing (8) that fits in said first cavity (6) and that has a second cavity (21) that is open towards said first connector and that contains a second optical contact (24) in which said second optical fiber (25) is fixed;
- said second connector (3) also comprising a wandering sub-assembly (38) that carries said pump (37) and that is movable in said second cavity (21) between a first position in which said wandering sub-assembly is retracted in said second cavity and a second position in which said wandering sub-assembly emerges partially from said second cavity, and
- said wandering sub-assembly (38) comprising a body (39) having a first passage for said second optical contact (24), said reserve (36) and a chamber (51) which is connected to said reserve by a second passage (52) containing a first non-return valve (53) allowing the fluid to pass only from said reserve to said chamber, wherein a piston (54) is in said chamber (51) and divides said chamber into a suction chamber (55), into which said second passage (52) opens, and a delivery chamber (56) that communicates with said first passage through a third passage (57) in said body (39) and that communicates with said space (58) through a fourth passage in said second optical contact (24).

* * * * *